(12) United States Patent
Jin et al.

(10) Patent No.: US 10,834,799 B2
(45) Date of Patent: Nov. 10, 2020

(54) VEHICLE LAMP CONTROL APPARATUS

(71) Applicant: SILICON WORKS CO., LTD., Daejeon (KR)

(72) Inventors: Hai Feng Jin, Daejeon (KR); Ju Hyun Lee, Daejeon (KR); Dong Hyeon Kim, Daejeon (KR); Sung Gon Kim, Daejeon (KR); Ho Jeong Jin, Daejeon (KR); Chang Sik Shin, Daejeon (KR); Ju Pyo Hong, Daejeon (KR)

(73) Assignee: Silicon Works Co., Ltd., Daejeon-si (KR)

( * ) Notice: Subject to any disclaimer, the term of this patent is extended or adjusted under 35 U.S.C. 154(b) by 0 days.

(21) Appl. No.: 16/656,316

(22) Filed: Oct. 17, 2019

(65) Prior Publication Data

US 2020/0128643 A1 Apr. 23, 2020

(30) Foreign Application Priority Data

Oct. 18, 2018 (KR) ........................ 10-2018-0124712

(51) Int. Cl.
*H05B 47/16* (2020.01)
*H05B 45/00* (2020.01)
*H05B 45/37* (2020.01)
*B60R 16/033* (2006.01)
*B60Q 1/34* (2006.01)

(52) U.S. Cl.
CPC ............. *H05B 47/16* (2020.01); *H05B 45/00* (2020.01); *H05B 45/37* (2020.01); *B60Q 1/34* (2013.01); *B60R 16/033* (2013.01)

(58) Field of Classification Search
CPC .......... H05B 47/16; H05B 45/00; B60Q 1/34; B60R 16/033
See application file for complete search history.

(56) References Cited

U.S. PATENT DOCUMENTS

| | | | | |
|---|---|---|---|---|
| 7,081,722 | B1* | 7/2006 | Huynh | H05B 45/48 315/323 |
| 8,164,276 | B2* | 4/2012 | Kuwabara | H05B 45/48 315/294 |
| 9,066,392 | B2* | 6/2015 | Lee | H05B 45/37 |
| 2011/0084619 | A1* | 4/2011 | Gray | H05B 45/44 315/185 R |
| 2013/0162144 | A1* | 6/2013 | Lee | H05B 45/48 315/122 |

(Continued)

FOREIGN PATENT DOCUMENTS

KR 20150139741 A 12/2015
KR 20160087088 A 7/2016

(Continued)

*Primary Examiner* — Raymond R Chai
(74) *Attorney, Agent, or Firm* — Polsinelli PC

(57) ABSTRACT

The present disclosure discloses a vehicle lamp control apparatus. The vehicle lamp control apparatus includes a timing generator configured to detect a setting voltage, which is varied, and measure a time in which the setting voltage reaches levels of a first reference voltage and a second reference voltage to generate a first delay time and a second delay time, and a lamp control circuit configured to control sequential turn-on of light-emitting diode (LED) channels using the first delay time and the second delay time.

18 Claims, 2 Drawing Sheets

(56) References Cited

U.S. PATENT DOCUMENTS

| | | | |
|---|---|---|---|
| 2014/0042918 A1* | 2/2014 | Lee | H05B 45/37 |
| | | | 315/185 R |
| 2017/0359868 A1* | 12/2017 | Kim | H05B 45/10 |
| 2018/0281668 A1 | 10/2018 | Martin | |

FOREIGN PATENT DOCUMENTS

| | | |
|---|---|---|
| KR | 20160097583 A | 8/2016 |
| KR | 20190028204 A | 3/2019 |

* cited by examiner

VEHICLE LAMP CONTROL APPARATUS

CROSS-REFERENCE TO RELATED APPLICATION

This application claims priority to and the benefit of Korean Patent Application No. 2018-0124712, filed on Oct. 18, 2018, the disclosure of which is incorporated herein by reference in its entirety.

BACKGROUND

1. Field of the Invention

The present disclosure relates to a lamp control technique and, more particularly, to a vehicle lamp control apparatus capable of precisely controlling sequential turn-on of vehicle lamps.

2. Description of Related Art

In general, vehicles are provided with lamps for various purposes.

As an example, there are lamps for various purposes which have a lighting function for easily identifying objects located around a vehicle and a signaling function for notifying a driving state of the vehicle.

Among such vehicle lamps, turn signal lamps are installed on left and right sides of front and rear portions of a vehicle and blink according to a driver's operation and are used for a function of notifying surrounding vehicles or pedestrians of the turning direction of the vehicle.

Meanwhile, in the development of high brightness light-emitting diodes (LEDs), LEDs have been adopted as a light source for a vehicle lamp, and as the LEDs are adopted as the light source, the design of vehicle lamps has been diversified, and as the design is diversified, the number of LED channels required for the configuration of the vehicle lamp is also increasing.

Recently, there is a need for a method of more intuitively recognizing a traveling direction of a vehicle, and there is also a need for technology capable of precisely controlling sequential turn-on of LED channels that are used as a vehicle lamp.

SUMMARY

The present disclosure is directed to providing a vehicle lamp control apparatus capable of precisely controlling sequential turn-on of vehicle lamps.

According to an aspect of the present disclosure, there is provided a vehicle lamp control apparatus including a timing generator configured to detect a setting voltage, which is varied, and measure a time in which the setting voltage reaches a level of a first reference voltage and a level of a second reference voltage to generate a first delay time and a second delay time, and a lamp control circuit configured to control sequential turn-on of light-emitting diode (LED) channels using the first delay time and the second delay time.

According to another aspect of the present disclosure, there is provided a vehicle lamp control apparatus including a timing generator configured to detect setting voltages, which are varied, in response to a battery status signal and generate delay times by measuring a time in which each of the setting voltages reaches a first reference voltage and a second reference voltage, a timing controller configured to generate a start signal using the battery status signal and at least one of the delay times and to generate channel control signals using the start signal and the remaining delay times, and a constant current controller configured to turn on at least one of light-emitting diode (LED) channels in response to the start signal and sequentially turn on the remaining LED channels in response to each of the channel control signals.

As described above, a vehicle lamp control apparatus according to the present embodiments can simply set delay times required for sequentially turning on vehicle lamps for each of LED channels using at least one external module and first and second reference voltages.

Further, the vehicle lamp control apparatus according to the present embodiments can simply set target delay times for each of the LED channels by adjusting at least one of a value of the external module, levels of the first and second reference voltages, and an intensity of a current. Thus, the present embodiments can precisely control sequential turn-on of the LED channels.

BRIEF DESCRIPTION OF THE DRAWINGS

The above and other objects, features, and advantages of the present disclosure will become more apparent to those of ordinary skill in the art by describing exemplary embodiments thereof in detail with reference to the accompanying drawings, in which.

DETAILED DESCRIPTION OF THE EMBODIMENTS

Hereinafter, embodiments of the present disclosure will be described in detail with reference to the accompanying drawings. The terms or words used in the present specification and claims should not be construed as being limited to ordinary or dictionary meanings and should be construed as meanings and concepts consistent with the spirit of the present disclosure.

Since embodiments described in the present specification and configurations illustrated in drawings are exemplary embodiments of the present disclosure and do not represent the overall technological scope of the present disclosure, the present disclosure covers various equivalents, modifications, and substitutions at the time of filing of this application.

Embodiments of the present disclosure provide a vehicle lamp control apparatus capable of simply setting at least one delay time that may be used to precisely control sequential turn-on of vehicle lamps using at least one external module and first and second reference voltages.

Figure 1:
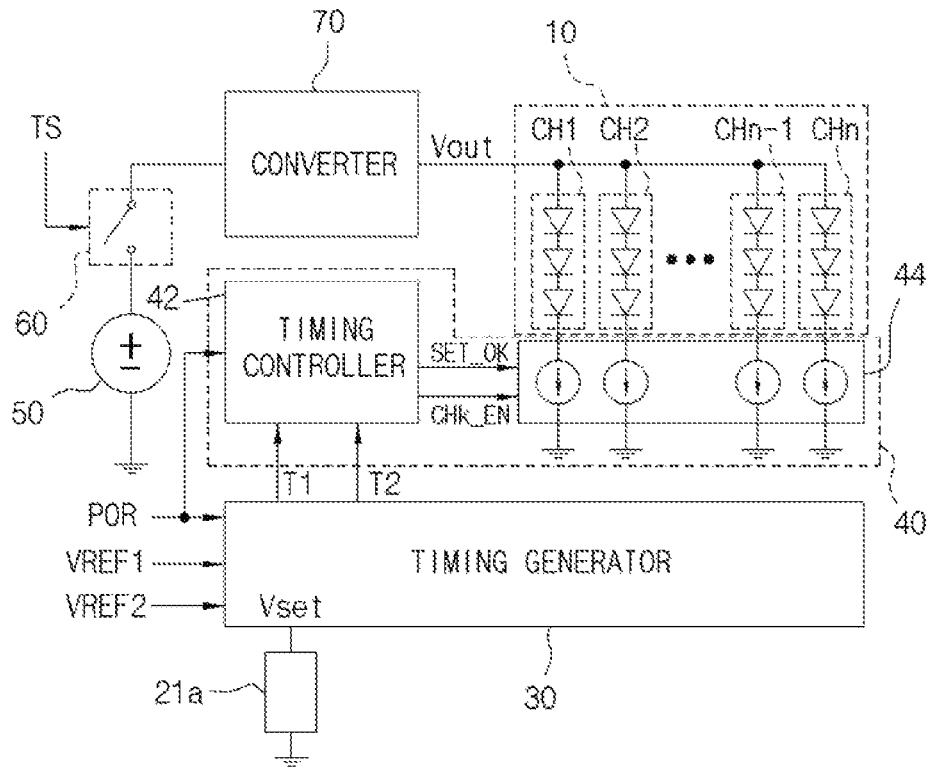
FIG. 1 is a block diagram of a vehicle lamp control apparatus according to one embodiment of the present disclosure.
Figure 2:
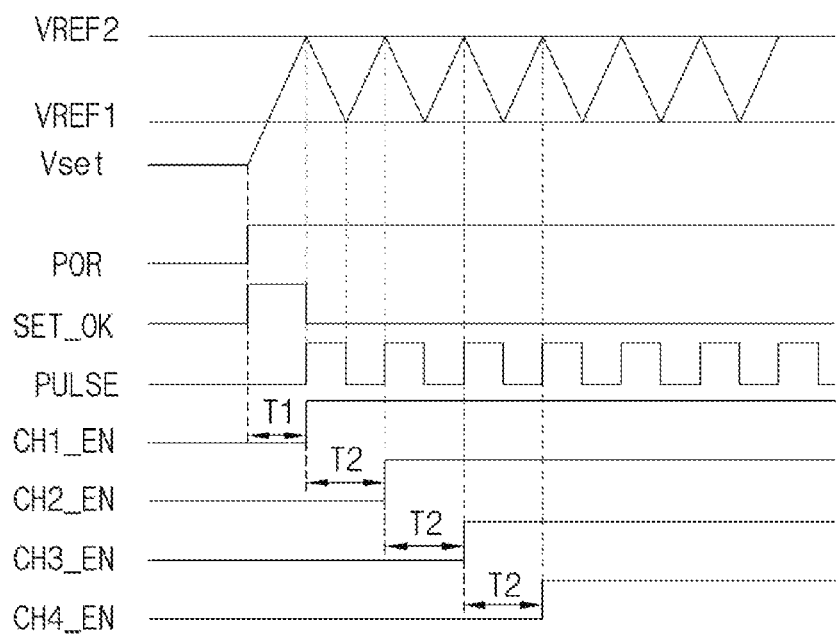
FIG. 2 is a timing diagram for describing an operation of the vehicle lamp control apparatus according to one embodiment of FIG. 1.

FIG. 1 is a block diagram of a vehicle lamp control apparatus according to one embodiment of the present disclosure, and FIG. 2 is a timing diagram for describing an operation of the vehicle lamp control apparatus according to one embodiment of FIG. 1.

Referring to FIGS. 1 and 2, the vehicle lamp control apparatus according to one embodiment may include a lamp 10, an external module 21a, a timing generator 30, a lamp control circuit 40, a switch circuit 60, and a converter 70.

The lamp 10 includes light-emitting diode (LED) channels CH1 to CHn. As an example, the lamp 10 may be used as a turn signal lamp of a vehicle, and each of the LED channels CH1 to CHn may be configured by connecting a plurality of LEDs in series or in series-parallel.

The external module 21a may be used to set first and second delay times T1 and T2 required for sequentially turning on the LED channels CH1 to CHn. As an example, the external module 21a may include at least one of a capacitor and a resistor or may include another external element.

The external module 21a has a setting voltage Vset, and the setting voltage Vset may be used to set the first and second delay times T1 and T2.

The setting voltage Vset may be varied, and the slope of the setting voltage Vset may be set with at least one of a value of the capacitor, a value of the resistor, an intensity of a current applied to the external module 21a, and levels of first and second reference voltages VREF1 and VREF2.

That is, in the embodiment, the first and second delay times T1 and T2 required for sequentially turning on the LED channels CH1 to CHn may be adjusted using at least one of the value of the capacitor, the value of resistor, the intensity of the current, and the level of the reference voltage.

Meanwhile, the embodiment of FIGS. 1 and 2 is implemented to adjust the slope of the setting voltage Vset through the external module 21a, but the present disclosure is not limited thereto.

A vehicle lamp control apparatus according to another embodiment may be configured to adjust the slope of the setting voltage Vset by receiving at least one of a pulse width modulation (PWM) signal and an analog signal from a microcontroller unit (MCU) (not shown) of the vehicle which is interlocked with a turn signal TS. Here, the first and second delay times T1 and T2 may be adjusted according to at least one of the PWM signal, the analog signal, and the levels of the reference voltages.

The timing generator 30 detects the setting voltage Vset that varies according to the current of the external module 21a when a battery status signal POR is activated and measures a time in which the setting voltage Vset reaches the first and second reference voltages VREF1 and VREF2 to generate the first and second delay times T1 and T2.

Here, the current of the external module 21a may be applied from the timing generator 30 when the battery status signal POR is activated or generated by the external module 21a. Here, the battery status signal POR may be activated when battery power supplied in conjunction with the turn signal of the vehicle is stabilized. Here, the setting voltages Vset may vary according to the current of the external module 21a or vary according to at least one of the PWM signal and the analog signal provided from the external MCU. Here, the second reference voltage VREF2 may be set to have a higher level than the first reference voltage VREF1.

The timing generator 30 measures a time from a time point at which the battery status signal POR is activated to a time point at which the setting voltage Vset reaches the level of the second reference voltage VREF2 and provides the first delay time T1 to the lamp control circuit 40.

As an example, the timing generator 30 may apply the current to the external module 21a when the battery status signal POR is activated and measure a time in which the setting voltage Vset, which varies according to the applied current, reaches the level of the second reference voltage VREF2 to generate the first delay time T1.

Here, the timing generator 30 may interrupt the current of the external module 21a when the setting voltage Vset that varies according to the current of the external module 21a reaches the level of the second reference voltage VREF2 and may apply the current to the external module 21a or control the external module 21a to generate the current when the setting voltage Vset drops and reaches the level of the first reference voltage VREF1 due to the interruption of the current.

The timing generator 30 may generate a pulse signal PULSE by interrupting the current of the external module 21a or applying the current to the external module 21a to measure a time in which the setting voltage Vset drops to reach the level of the first reference voltage VREF1 and a time in which the setting voltage Vset rises to reach the level of the second reference voltage VREF2.

The timing generator 30 may set the second delay time T2 using the pulse signal PULSE. As an example, as illustrated in FIG. 2, the timing generator 30 may set one period of the pulse signal PULSE as the second delay time T2. However, the present disclosure is not limited thereto, and the timing generator 30 may set a half period or several periods of the pulse signal PULSE as the second delay time T2 according to an application.

The lamp control circuit 40 turns on one of the LED channels using the first delay time T1 and sequentially turns on the remaining LED channels using the second delay time T2.

As an example, the lamp control circuit 40 may turn on one of the LED channels when the first delay time T1 has passed from the time point at which the battery status signal POR is activated and then sequentially turn on the remaining LED channels at an interval of the second delay time T2. As another example, the lamp control circuit 40 may be configured to turn on a first LED channel or turn on first and second LED channels simultaneously when the first delay time T1 has passed and sequentially turn on the remaining LED channels at the interval of the second delay time T2.

Further, the lamp control circuit 40 may receive a vehicle status signal (not shown) and simultaneously turn on some or all LED channels according to the vehicle status signal. As an example, the vehicle status signal may have a logic level set according to whether the turn signal TS and an emergency signal (not shown) are activated, and the lamp control circuit 40 may sequentially turn on the LED channels or simultaneously turn on all the LED channels according to the logic level of the vehicle status signal.

The lamp control circuit 40 may include a timing controller 42 and a constant current controller 44. The timing controller 42 generates a start signal SET_OK using the battery status signal POR and the first delay time T1 and generates a channel control signal CHk_EN using the start signal SET_OK and the second delay time T2.

As an example, the start signal SET_OK has a pulse width from the time point at which the battery status signal POR is activated to a time point at which the first delay time T1 has passed, and the channel control signal CHk_EN may be synchronized to the start signal SET_OK to be enabled at the interval of the second delay time T2. Here, the start signal SET_OK may be used to set delays between integrated circuits (ICs), and the channel control signal CHk_EN may be used to set delays between the LED channels.

The constant current controller 44 turns on at least one of the LED channels CH1 to CHn in response to the start signal SET_OK and sequentially turns on the remaining LED channels in response to the channel control signal CHk_EN. The constant current controller 44 may include switches each configured to control each of the LED channels CH1 to CHn with a constant current in response to the channel control signal CHk_EN.

The constant current controller 44 illustrated in FIG. 1 is configured to be located on cathode sides of the LED channels but is not limited thereto and may be configured to be located on anode sides of the LED channels.

The vehicle lamp control apparatus may be formed of one IC or a plurality of ICs. Meanwhile, when the vehicle lamp control apparatus includes the plurality of ICs, the start signal SET_OK, which is set to at least one of the ICs, may be set to a time at which all LED channels driven in the previous IC are turned on. That is, the start signal SET_OK may be used to set the delay times between ICs.

The switch circuit 60 supplies a power of a battery 50 to the converter 70. Here, the switch circuit 60 may be activated in response to the turn signal TS interlocked with a turn signal switch (not shown) of the vehicle.

The converter 70 regulates the power supplied from the battery 50 and applies a regulated predetermined voltage Vout to the LED channels CH1 to CHn of the lamp 10. The embodiment described with reference to FIG. 1 is configured to apply the predetermined voltage Vout to the lamp 10 by regulating the battery power, but is not limited thereto, and may be configured such that the converter 70 is omitted and the battery power is directly applied to the lamp 10 through the switch circuit 60 according to an application.

Meanwhile, the external module 21a may include at least one of the capacitor and the resistor that are capable of adjusting the slope of the setting voltage Vset that varies according to the current or another external module. As another example, when the battery status signal POR is activated, a current may be generated by the external module 21a, the magnitude of the current may be varied according to a value of the external module 21a, and the slope of the setting voltage Vset may be adjusted using the current.

Here, the first and second delay times T1 and T2 may be determined according to at least one of the values of the capacitor and the resistor or may be determined according to the levels of the first and second reference voltages and the intensity of the current of the external module 21a. That is, in the present embodiment, the first and second delay times T1 and T2 may be generated by adjusting the slope of the setting voltage Vset according to at least one of the value of the external module 21a, the levels of the first and second reference voltages, and the intensity of the current. Here, in the present embodiment, the first and second delay times T1 and T2 may be generated with one resistor by varying the slope of the setting voltage Vset by varying the levels of the first and second reference voltages VREF1 and VREF2 or by adjusting the intensity of the current through internal setting.

Further, as another embodiment, the slope of the setting voltage Vset may be adjusted by receiving at least one of the PWM signal and the analog signal from the external MCU, and in this case, the first and second delay times T1 and T2 may be set according to at least one of values of the PWM signal and the analog signal, and the levels of the reference voltages.

Meanwhile, in the embodiment of FIG. 2, the start signal SET_OK is set to the first delay time T1 from the time point at which the battery status signal POR is activated to a time point at which the setting voltage Vset reaches the level of the second reference voltage VREF2, but the present disclosure is not limited thereto.

Figure 3:
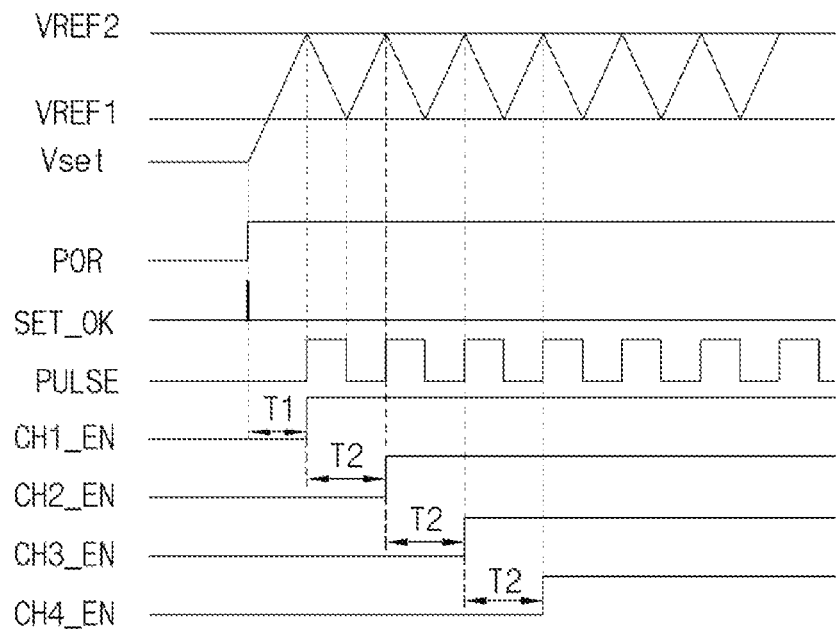
FIG. 3 is a timing diagram for describing an operation of the vehicle lamp control apparatus according to another embodiment of FIG. 1.

As shown in FIG. 3, in another embodiment, the value of the start signal SET_OK may be set to zero after the battery status signal POR is activated according to an application.

Here, the start signal SET_OK may be generated as a strobe in synchronization with a time point at which the battery status signal POR is activated. In addition, the first delay time T1 may be set to a time from the time point at which the battery status signal POR is activated or a time point at which the strobe of the start signal SET_OK is generated to a time point at which the setting voltage Vset reaches the level of the second reference voltage VREF2.

As in the embodiment described with reference to FIG. 2, the second delay time T2 may be set to one period of a pulse signal PULSE generated using a time in which the setting voltage Vset drops to reach the level of the first reference voltage VREF1 and a time in which the setting voltage Vset rises again to reach the level of the second reference voltage VREF2. Alternatively, the second delay time T2 may be set to a half period or several periods of the pulse signal PULSE according to an application.

Figure 4:
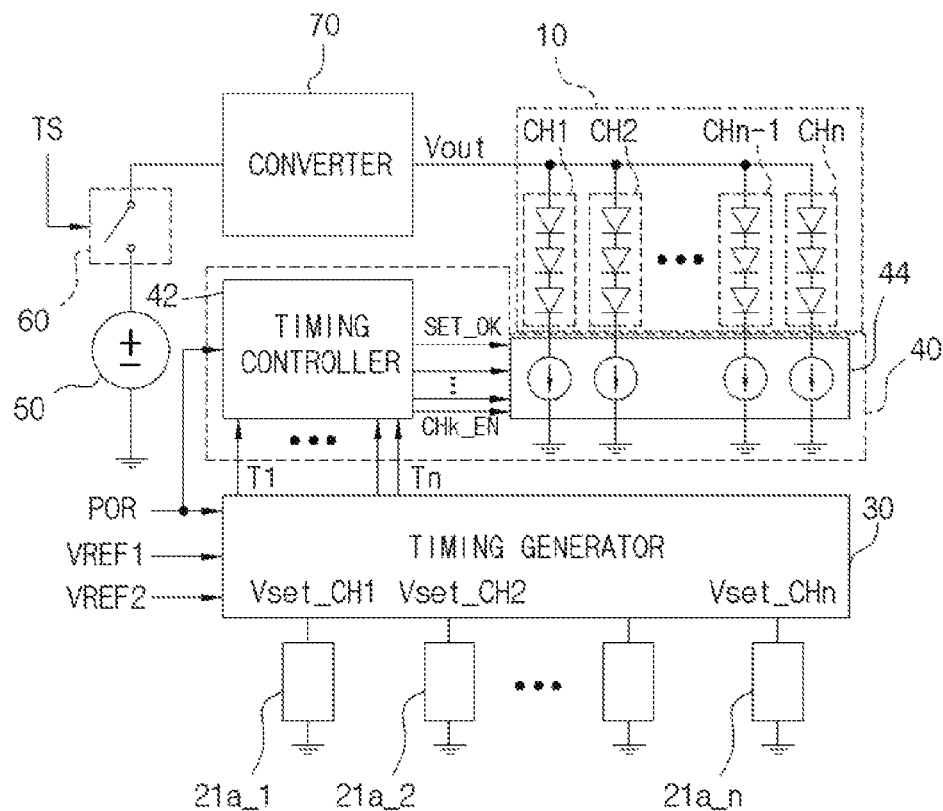
FIG. 4 is a block diagram of a vehicle lamp control apparatus according to another embodiment of the present disclosure.

FIG. 4 is a block diagram of a vehicle lamp control apparatus according to another embodiment of the present disclosure. The embodiment of FIG. 4 illustrates that first to n-th delay times T1 to Tn are individually generated to turn on each of LED channels CH1 to CHn, and each of the LED channels CH1 to CHn is turned on sequentially using the generated delay times T1 to Tn.

Referring to FIG. 4, the vehicle lamp control apparatus according to another embodiment may include a lamp 10, external modules 21a_1 to 21a_n, a timing generator 30, a lamp control circuit 40, a switch circuit 60, and a converter 70.

The lamp 10 includes the LED channels CH1 to CHn. As an example, each of the LED channels CH1 to CHn may be configured by connecting a plurality of LEDs in series or in series-parallel.

The external modules 21a_1 to 21a_n may be used to set the delay times T1 to Tn required for sequentially turning on the LED channels CH1 to CHn. At least one of the external modules 21a_1 to 21a_n may be used to set the first delay time T1 after which at least one of the LED channels CH1 to CHn turns on after a power state of a battery is stabilized, and the remaining external modules may be used to set the second to n-th delay times T2 to Tn for sequentially turning on the remaining LED channels.

The timing generator 30 detects voltages Vset_CH1 to Vset_CHn that vary according to currents of the external modules 21a_1 to 21a_n, respectively, when a battery status signal POR is activated. Here, the currents of the external modules 21a_1 to 21a_n may be generated by the external modules 21a_1 to 21a_n, respectively, or may be applied when the battery status signal POR is activated. Here, the battery status signal POR may be activated when battery power supplied in conjunction with a turn signal TS of a vehicle is stabilized.

In addition, the timing generator 30 may generate the delay times T1 to Tn by measuring a time in which each of the voltages Vset_CH1 to Vset_CHn reaches first and second reference voltages VREF1 and VREF2. As an example, the timing generator 30 may set a time from a time point at which the battery status signal POR is activated to a time point at which the setting voltage Vset reaches a level of the second reference voltage VREF2 as the first delay time T1.

The timing generator 30 may interrupt the applied current when the setting voltage Vset that varies according to the currents of the external modules 21a_1 to 21a_n reaches the level of the second reference voltage VREF2 and may apply the currents again to the external modules 21a_1 to 21a_n or control the external modules 21a_1 to 21a_n to generate the currents when the setting voltage Vset drops and reaches a level of the first reference voltage VREF1 due to the interruption of the current.

The timing generator 30 may generate a pulse signal PULSE using a time in which the setting voltage Vset reaches the level of the first reference voltage VREF1 from the level of the second reference voltage VREF2 and a time in which the setting voltage Vset reaches the level of the second reference voltage VREF2 from the level of the first reference voltage VREF1, which are obtained by applying and interrupting the current. The timing generator 30 may set a second delay time T2 using the pulse signal PULSE. As an example, one period of the pulse signal PULSE may be set as the second delay time T2, or a half period or several periods of the pulse signal PULSE may be set as the second delay time T2.

The lamp control circuit 40 may turn on at least one of the LED channels using the first delay time T1 of the first to n-th delay times T1 to Tn and sequentially turn on the remaining LED channels using the second to n-th delay times T2 to Tn.

As an example, the lamp control circuit 40 may sequentially turn on all of the LED channels CH1 to CHn through the method of turning on an LED channel CH1 among the LED channels CH1 to CHn when the first delay time T1 has passed from a time point at which the battery status signal POR is activated, turning on a next LED channel that is an LED channel CH2 when the second delay time T2 has passed from a time point at which the LED channel CH1 is turned on, and turning on a next LED channel that is an LED channel CH3 when a third delay time T3 has passed from a time point at which the LED channel CH2 is turned on.

Here, the first to n-th delay times T1 to Tn may be set to be the same or different for each of the LED channels using the external modules 21a_1 to 21a_n. Here, each of the first to n-th delay times T1 to Tn may be determined according to at least one of values of a capacitor and a resistor constituting each of the external modules or determined according to at least one of the levels of the first and second reference voltages and intensities of the currents applied to or generated by the external modules. That is, in the present embodiment, the turning on times for the LED channels may be individually set by adjusting at least one of values of the external modules, the levels of the first and second reference voltages, and the intensities of the currents of the external modules.

The lamp control circuit 40 may include a timing controller 42 and a constant current controller 44. The timing controller 42 generates a start signal SET_OK using the battery status signal POR and the first delay time T1 and generates channel control signals CHk_EN using the start signal SET_OK and the second to n-th delay times T2 to Tn. The constant current controller 44 turns on one of the LED channels CH1 to CHn in response to the start signal SET_OK and sequentially turns on the remaining LED channels in response to each of the channel control signals CHk_EN.

Meanwhile, the vehicle lamp control apparatus may be formed of a plurality of ICs, and here, the start signal SET_OK, which is set in one of the ICs, may be set to a time at which all LED channels driven in the previous ICs are turned on. That is, the start signal SET_OK may be used to set delay times between the plurality of ICs.

As described above, the vehicle lamp control apparatus according to the present embodiments may simply set the delay times required for sequentially turning on the vehicle lamps for each of the LED channels using at least one external module and the first and second reference voltages VREF1 and VREF2.

Further, the vehicle lamp control apparatus according to the present embodiments may simply set the target delay times for each of the LED channels by adjusting at least one of the value of the external module, the levels of the first and second reference voltages, and the intensity of the current. Thus, the present embodiments may precisely control the sequential turn-on of the LED channels.

What is claimed is:

1. A vehicle lamp control apparatus comprising:
   a timing generator configured to detect a setting voltage, which is varied, and measure a time in which the setting voltage reaches a level of a first reference voltage and a level of a second reference voltage to generate a first delay time and a second delay time; and
   a lamp control circuit configured to control sequential turn-on of light-emitting diode (LED) channels using the first delay time and the second delay time,
   wherein the timing generator receives a battery status signal and sets a first time from a time point at which the battery status signal is activated to a time point at which the setting voltage reaches the level of the second reference voltage as the first delay time.

2. The vehicle lamp control apparatus of claim 1, wherein the timing generator generates a pulse signal using a second time in which the setting voltage reaches the level of the first reference voltage from the level of the second reference voltage and a third time in which the setting voltage reaches the level of the second reference voltage from the level of the first reference voltage.

3. The vehicle lamp control apparatus of claim 2, wherein the timing generator sets the second delay time using the pulse signal.

4. The vehicle lamp control apparatus of claim 1, wherein the timing generator receives the battery status signal, which is activated when battery power supplied in conjunction with a turn signal is stabilized, and provides the first delay time and the second delay time to the lamp control circuit in response to the battery status signal.

5. The vehicle lamp control apparatus of claim 1, further comprising an external module connected to the timing generator, wherein the timing generator detects the setting voltage that is varied according to a current of the external module.

6. The vehicle lamp control apparatus of claim 5, wherein the external module includes at least one of a capacitor and a resistor.

7. The vehicle lamp control apparatus of claim 6, wherein the timing generator adjusts the first delay time and the second delay time according to at least one of a value of the capacitor, a value of the resistor, the levels of the first reference voltage and the second reference voltage, and an intensity of the current of the external module.

8. The vehicle lamp control apparatus of claim 1, wherein the timing generator detects the setting voltage varied according to at least one of values of a pulse width modulation (PWM) signal and an analog signal that are provided from outside.

9. The vehicle lamp control apparatus of claim 8, wherein the timing generator adjusts the first delay time and the second delay time according to at least one of the PWM signal, the analog signal, and the levels of the first reference voltage and the second reference voltage.

10. The vehicle lamp control apparatus of claim 1, further comprising:
   a switch circuit configured to supply battery power in response to a turn signal; and
   a converter configured to regulate the battery power supplied from the switch circuit and to provide a predetermined voltage, which is obtained by regulating the battery power, to the LED channels.

11. The vehicle lamp control apparatus of claim 1, wherein the lamp control circuit includes:
   a timing controller configured to generate a start signal using a battery status signal and the first delay time and generate a channel control signal using the start signal and the second delay time; and
   a constant current controller configured to turn on at least one of the LED channels in response to the start signal and sequentially turn on the remaining LED channels in response to the channel control signal.

12. A vehicle lamp control apparatus comprising:
   a timing generator configured to detect setting voltages, which are varied, in response to a battery status signal and measure a time in which each of the setting voltages reaches a level of a first reference voltage and a level of a second reference voltage to generate delay times;
   a timing controller configured to generate a start signal using the battery status signal and at least one of the delay times and to generate channel control signals using the start signal and remaining delay times not used to generate the start signal; and
   a constant current controller configured to turn on at least one of light-emitting diode (LED) channels in response to the start signal and sequentially turn on the remaining LED channels in response to each of the channel control signals,
   wherein the timing generator sets a first time from a time point at which the battery status signal is activated to a time point at which a preset one of the setting voltages reaches a level of the second reference voltage as a first delay time.

13. The vehicle lamp control apparatus of claim 12, wherein the timing generator generates a pulse signal using a second time in which each of the setting voltages reaches a level of the first reference voltage from the level of the second reference voltage and a third time in which each of the setting voltages reaches the level of the second reference voltage from the level of the first reference voltage.

14. The vehicle lamp control apparatus of claim 13, wherein the timing generator sets the remaining delay times not used to generate the start signal using the pulse signal.

15. The vehicle lamp control apparatus of claim 12, wherein the timing generator receives the battery status signal, which is activated when battery power supplied in conjunction with a turn signal is stabilized, and provides the delay times to the timing controller in response to the battery status signal.

16. The vehicle lamp control apparatus of claim 12, further comprising external modules connected to the timing generator,
   wherein the timing generator detects the setting voltages varied according to a current of each of the external modules,
   the external modules each include at least one of a capacitor and a resistor, and
   the timing generator adjusts each of the delay times according to at least one of a value of the capacitor, a value of the resistor, the levels of the first reference voltage and the second reference voltage, and an intensity of the current of each of the external modules.

17. The vehicle lamp control apparatus of claim 12, wherein the timing generator detects each of the setting voltages varied according to at least one of a pulse width modulation (PWM) signal and an analog signal that are provided from outside, and adjusts each of the delay times according to at least one of values of the PWM signal and the analog signal and levels of the first reference voltage and the second reference voltage.

18. The vehicle lamp control apparatus of claim 12, wherein when a lamp control circuit includes a plurality of integrated circuits (ICs), at least one of the ICs sets the start signal to a time at which all the LED channels driven in the previous ICs are turned on.

* * * * *